United States Patent
Brule et al.

(10) Patent No.: US 10,464,258 B2
(45) Date of Patent: Nov. 5, 2019

(54) METHOD FOR PRODUCING AN OBJECT BY MELTING A POLYMER POWDER IN A POWDER SINTERING DEVICE

(71) Applicant: Arkema France, Colombes (FR)

(72) Inventors: Benoît Brule, Beaumont-le-Roger (FR); Nadine Decraemer, Beaumontel (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/384,055

(22) Filed: Apr. 15, 2019

(65) Prior Publication Data

US 2019/0240899 A1 Aug. 8, 2019

Related U.S. Application Data

(62) Division of application No. 15/536,505, filed as application No. PCT/FR2015/053540 on Dec. 16, 2015, now Pat. No. 10,322,542.

(30) Foreign Application Priority Data

Dec. 16, 2014 (FR) ..................................... 14 62502

(51) Int. Cl.

| | |
|---|---|
| *B29C 64/00* | (2017.01) |
| *B33Y 10/00* | (2015.01) |
| *B29C 64/153* | (2017.01) |
| *B33Y 70/00* | (2015.01) |
| *B29K 105/00* | (2006.01) |
| *B29K 271/00* | (2006.01) |
| *B29K 277/00* | (2006.01) |

(52) U.S. Cl.
CPC ............ *B29C 64/153* (2017.08); *B33Y 10/00* (2014.12); *B33Y 70/00* (2014.12); *B29K 2105/0094* (2013.01); *B29K 2271/00* (2013.01); *B29K 2277/00* (2013.01)

(58) Field of Classification Search
CPC ......... B29C 64/00; B29C 64/10; B29C 64/15; B29C 64/15; B29C 64/153; B33Y 10/00; B33Y 70/00
See application file for complete search history.

(56) References Cited

U.S. PATENT DOCUMENTS

2014/0322441 A1* 10/2014 Mathieu .................. B29B 13/10
                                                              427/180
2016/0333190 A1* 11/2016 Brule ........................ C08K 3/22

FOREIGN PATENT DOCUMENTS

| WO | 2013/068686 A1 | 5/2013 |
| WO | 2015/092272 A1 | 6/2015 |

OTHER PUBLICATIONS

International Search Report (PCT/ISA/210) dated Mar. 18, 2016, by the French Patent Office as the International Searching Authority for International Application No. PCT/FR2015/053540.
Robert-Stirling-Ring, "Material data sheet EOS Gmbh—Electro Optical Systems PA2200", Dec. 1, 2008, XP055217772.

* cited by examiner

*Primary Examiner* — Seyed Masoud Malekzadeh
*Assistant Examiner* — Matthew Hoover
(74) *Attorney, Agent, or Firm* — Buchanan Ingersoll & Rooney P.C.

(57) ABSTRACT

A graft copolymer comprising: a core polymer comprising a crosslinked or non-crosslinked polysaccharide, a plurality of primary graft polymers covalently grafted to the core polymer, a plurality of secondary graft polymers covalently grafted to each primary graft polymer, an injectable dermal aesthetic formulation comprising such a graft copolymer and a method of preparing such a graft copolymer.

9 Claims, 2 Drawing Sheets

METHOD FOR PRODUCING AN OBJECT BY MELTING A POLYMER POWDER IN A POWDER SINTERING DEVICE

CROSS REFERENCE TO RELATED APPLICATIONS

The present application is a division of U.S. application Ser. No. 15/536,505, filed on Jun. 15, 2017, which is a U.S. national stage of International Application No. PCT/FR2015/053540, filed on Dec. 16, 2015. The entire contents of each of U.S. application Ser. No. 15/536,505 and International Application No. PCT/FR2015/053540 are hereby incorporated herein by reference in their entirety.

TECHNICAL FIELD

The present invention relates to a process for manufacturing an object by melting a polymer powder in a laser-beam powder sintering device and carrying out a rheological analysis of the polymers in order to guarantee the conditions for manufacturing an object by melting polymer powders. It is not limited to particular polymers and therefore relates to any type of polymers that can be used in the manufacture of an object by melting polymer powders in a laser-beam powder sintering device. The invention also relates to the compositions having particular viscosity characteristics used in a powder sintering device.

BACKGROUND

Laser-beam powder sintering technology is used to manufacture three-dimensional objects, such as prototypes or models but also functional parts, in particular in the automobile, nautical, aeronautical, aerospace, medical (prostheses, auditory systems, cell tissues, and the like), textile, clothing, fashion, decorative, electronic casing, telephony, home automation, computing or lighting fields.

A thin layer of powder of the polymer in question is deposited on a horizontal plate maintained in a chamber heated to a certain temperature. The laser supplies the energy required to melt the powder particles at various points of the layer of powder in a geometry corresponding to the object, for example using a computer that stores the shape of the object and that reproduces this shape in the form of slices. Next, the horizontal plate is lowered by a value corresponding to the thickness of one layer of powder (for example between 0.05 and 2 mm and generally of the order of 0.1 mm), then a new layer of powder is deposited. This layer of powder is at a temperature referred to subsequently as the temperature of the powder bed (or temperature of the bed). The laser supplies the energy required to melt the powder particles in a geometry corresponding to this new slice of the object and so on. The procedure is repeated until the entire object has been manufactured. Besides the melting of the powder particles induced by the energy supplied by the laser, it is necessary to use conditions that enable the coalescence of the particles with one another and a good adhesion/coalescence of the layers with one another so that the mechanical properties of the objects manufactured are maximized. One determining parameter in obtaining parts with optimal properties is the temperature of the powder bed.

To date, the search for the optimal temperature of the powder bed for a given polymer used in laser sintering goes through sintering tests then through an analysis of the parts obtained (density, porosity, mechanical properties, etc.). Analysis of the parts makes it possible to single out the best experimental parameters and improvement paths for future tests aiming to determine the optimal parameters. It is therefore necessary to carry out several tests under real conditions for producing an object (at various temperatures of the powder bed in particular) in order to determine the conditions that allow the manufacturing of parts with maximized properties. This takes time and is expensive both regarding machine and operator time or else consumption of polymer powder.

The methodology used in the process that is the subject of the present invention makes it possible to understand the behavior of the material under the conditions of the polymer powder melting process and to select, for a given material, the process conditions (in particular the temperature of the powder bed) in order to ensure a coalescence of the particles with one another and between the successive layers.

It is well known to a person skilled in the art that the transformation window (temperature range of the powder bed) is between the crystallization temperature (Tc) and the melting temperature (Tm) of the polymer considered in the case of semicrystalline polymers. In the case of amorphous polymers, the transformation window lies above the glass transition temperature (Tg) as measured by differential thermal analysis (DSC).

In the case of semicrystalline polymers, if the temperature of the powder bed is too close to Tm, then there is agglomeration (caking) of the powder outside of the zone constituting the object, hence a loss of material. Furthermore, the molten polymer risks being too fluid and may flow beyond the first layer being formed or beyond the contours.

If the temperature of the powder bed is too close to Tc, then there is deformation (curling) of the part, due to the excessively rapid crystallization of the successive layers of the material.

In the case of amorphous polymers, the temperature of the powder bed should be above the Tg. In this case, the absence of crystallization makes it possible, on the one hand, to avoid the deformation of the parts and, on the other hand, to limit the phenomenon of shrinkage of the parts during the cooling phase.

If the temperature of the powder bed is too far above the Tg, there is agglomeration (caking) of the powder outside of the zone constituting the object, hence a loss of material. Furthermore, the molten polymer risks being too fluid and may flow beyond the first layer being formed or beyond the contours.

Outside of a particular temperature range of the polymer powder bed, the quality of the part obtained is not right.

DSC studies therefore make it possible to set a temperature range (between Tc and Tm for semicrystalline polymers and above Tg for amorphous polymers) in which it is then necessary to choose, via successive machine tests and via an analysis of the parts obtained, the appropriate temperature of the powder bed. In addition to providing just a temperature range, these DSC tests only very partially take into account the specificities of the products, for example their molecular weight.

In this laser sintering process, the portion of the powder bed affected by the layer in the process of being sintered, after fusion by the laser, rapidly returns to the temperature of the powder bed. It is therefore this temperature that controls the viscosity of the molten material, which key parameter governs the coalescence of the particles with one another and between the successive layers. Moreover, this adapted viscosity should last a certain time in order to obtain a coalescence of the particles with one another and between the successive layers. This time is defined as "the open time". Specifically, in the case of semicrystalline polymers, cooling induces a crystallization which leads to an increase in the viscosity and, beyond a certain viscosity value, the successive layers will no longer be able to coalesce (since the excessively high viscosity will become an impediment to the coalescence).

The applicant has observed that the conditions allowing a good adhesion and a good coalescence between the powder particles on the one hand, and between the layers of coalesced powders on the other hand, may be understood with the aid of a rheological analysis. This analysis makes it possible to precisely establish the ideal temperature range condition of the powder bed that makes it possible to prepare objects by melting polymer powders and in particular the laser sintering of polymers. It therefore makes it possible to establish the temperature range from the viscosity of the melted layer and from the open time allowing a good coalescence of the particles with one another and between the successive layers.

SUMMARY

The invention relates to a process for manufacturing an object by melting a polymer powder in a laser-beam powder sintering device comprising the following steps:
  manufacturing the object in a laser-beam powder sintering device at the initial temperature of the powder bed, said initial temperature of the powder bed being selected in the following manner:
  establishing the viscosity behavior of the polymer powder as a function of the time and of a descending temperature gradient starting from a supercooling temperature, corresponding to the temperature of the powder bed, that the layer melted at T>Tm by the laser rapidly returns to via cooling, the viscosity measurements being carried out in a plate-plate rheometer device at a stress frequency of less than 5 rad/s.
  selecting the initial temperature corresponding to the temperature of the powder bed allowing a viscosity of the supercooled polymer of between 800 and 20,000 Pa·s during a time range of more than 5 minutes.

DETAILED DESCRIPTION

The process of the invention applies to any thermoplastic polymer powder intended for the laser sintering process.

Such powders are usually characterized by:
  a Dv50 of around 50 microns, or more specifically of between 40 and 60 microns. The Dv50 referred to here is the median diameter by volume, which corresponds to the value of the particle size which divides the population of particles examined exactly into two. The Dv50 is measured according to the standard ISO 9276—parts 1 to 6. In the present description, a Malvern particle sizer, Mastersizer 2000, is used and the measurement is carried out by the liquid route by laser diffraction on the powder.
  sufficient flowability to enable machine layering, which translates into a certain sphericity of the powder particles.

The process that is the subject of the invention relates to any type of thermoplastic polymer, whether it is amorphous or semicrystalline, and preferably semicrystalline. It may be a question of polyolefins (PE, PP), polyvinyls (PVC, PVDC), styrenes (PS), polyacrylonitrile butadiene styrene (ABS), polybutylene terephthalate (PBT), polyethylene terephthalate (PET), polycarbonate (PC), ethylene-vinyl acetate copolymer (EVA, EVM), ethylene-vinyl alcohol copolymer (EVOH), aliphatic or aromatic polyamides or copolyamides (PA 6-6, PA 6, PA 11, PA 12, PA 4-6, PA 6-10, PA 6-12), polyether block amides (PEBA), polyamide-imide (PAI), poly(meth)acrylics (PMMA), polymethyl methacrylate butadiene styrene (MBS), polyacrylonitrile (PAN), polyaryletherketones (PEK, PEEK, PEKK, PEKEKK, etc.), polyimides (PI), fluoropolymers (PTFE, PVDF), aromatic polyethers (PPO), polylactic acid (PLA), silicones, thermoplastic elastomers taken alone or as mixtures. Other polymers or copolymers, whether they are statistical, gradient or block polymers or copolymers, cannot be excluded.

The polymers could contain the following additives: stabilizer (heat or UV stabilizer), conductive fillers (in particular carbon fibers, carbon nanotubes, carbon black), reinforcing fillers (carbon fibers, glass fibers, beads or any other inorganic filler), milled fibers having a length of less than 300 µm and preferably of less than 100 µm.

Preferably, they are polyamides or polyaryletherketones, more particularly PA 11, PA 12, PEK, PEEK, PEKK.

The process for manufacturing an object by fusion-coalescence of polymer powders, and in particular laser sintering, requires particular viscosity conditions of the sintered layer.

Specifically, for the manufacture of an object with maximum performance, in particular for the mechanical properties, the viscosity should be neither too low, nor too high. In addition, this optimal viscosity should last for the time required for a good coalescence of the powders.

Figure 1:
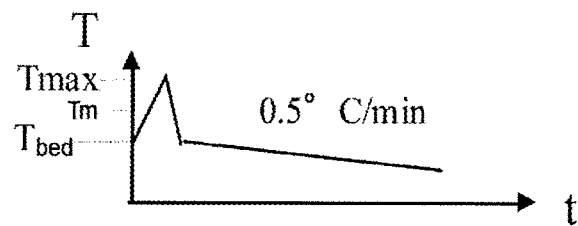
FIG. 1 shows diagram where the heat cycle experienced by a powder bed is summarized as a function of the time.

In this laser sintering process, the powder before laser sintering is at the temperature of the powder bed (denoted by Tbed). Next, the laser supplies the energy required for melting the powder, which therefore rapidly rises to a temperature above its Tm (in the case of semicrystalline polymers, temperature denoted by Tmax). Then, the sintered powder rapidly returns to Tbed and then undergoes a slow cooling (cooling of between 0.1° C./min and 1° C./min). In what follows it has been chosen to set the cooling rate at 0.5° C./min. In summary, the heat cycle experienced by the powder bed may therefore be summarized as a function of the time by the diagram visible in FIG. 1.

During this heat cycle, the phases of coalescence of the powder and of the layers with one another take place during cooling phases after Tmax (firstly the very short phase from Tmax to Tbed then a longer phase during the slow cooling starting from Tbed).

At the end of numerous tests under real conditions in a laser sintering device, and by reproducing these conditions in a plate-plate rheometer, the applicant observed that this viscosity should be between 800 and 20,000 Pa·s, and preferably between 1000 and 10,000 Pa·s. Throughout the time necessary for the correct coalescence of the powders, this viscosity should remain between 800 and 20,000 Pa·s, and preferably between 1000 and 10,000 Pa·s. This time referred to as "open time" should be more than 5 minutes, preferably more than 10 minutes.

The invention also relates to compositions comprising a semicrystalline polymer having a viscosity of between 800 and 20,000 Pa·s, and preferably of between 1000 and 10,000 Pa·s over a time of more than 5 minutes and preferably of more than 10 min, the viscosity measurements being carried out in a plate-plate rheometer device at a stress frequency of less than 5 rad/s, said composition being supercooled to a temperature T below the melting temperature after exposure to a temperature Tmax above its melting point and that can be used in a device for manufacturing objects by melting polymer powders and in particular the laser sintering of polymers.

The compositions that are the subject of the invention relate to any type of thermoplastic polymer, whether it is amorphous or semicrystalline. It may be a question of polyolefins (PE, PP), polyvinyls (PVC, PVDC), styrenes (PS), polyacrylonitrile butadiene styrene (ABS), polybutylene terephthalate (PBT), polyethylene terephthalate (PET), polycarbonate (PC), ethylene-vinyl acetate copolymer (EVA, EVM), ethylene-vinyl alcohol copolymer (EVOH), aliphatic or aromatic polyamides or copolyamides (PA 6-6, PA 6, PA 11, PA 12, PA 4-6, PA 6-10, PA 6-12), polyether block amides (PEBA), polyamide-imide (PAI), poly(meth) acrylics (PMMA), polymethyl methacrylate butadiene styrene (MBS), polyacrylonitrile (PAN), polyaryletherketones (PEK, PEEK, PEKK, PEKEKK, etc.), polyimides (PI), fluoropolymers (PTFE, PVDF), aromatic polyethers (PPO), polylactic acid (PLA), silicones, thermoplastic elastomers taken alone or as mixtures. Other polymers or copolymers, whether they are statistical, gradient or block polymers or copolymers, cannot be excluded.

The polymers could contain the following additives: stabilizer (heat or UV stabilizer), conductive fillers (in particular carbon fibers, carbon nanotubes, carbon black), reinforcing fillers (carbon fibers, glass fibers, beads or any other inorganic filler), milled fibers having a length of less than 300 μm and preferably of less than 100 μm. The preferred compositions are polyamides or polyaryletherketones, more particularly PA 11, PA 12, PEK, PEEK, or else PEKK.

The rheometers that can be used are rheometers of plate-plate or cone-plate type, that is to say rheometers for measuring high viscosities (typically of entangled thermoplastic polymers) at low frequencies, typically of less than 5 rad/s.

EXAMPLE 1

Figure 2:
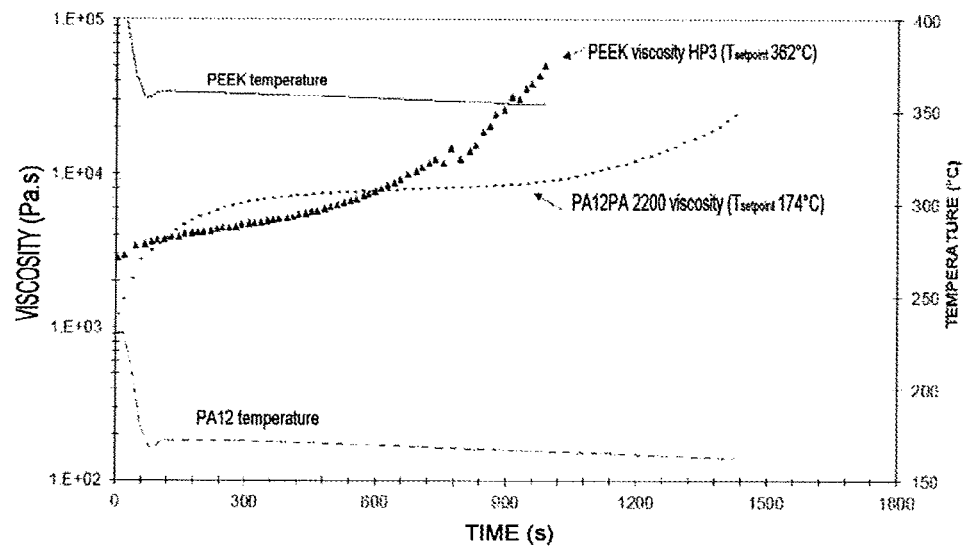
FIG. 2 shows curves of the heat cycles experienced by the PEEK and PA 12 powders during the cooling cycle.

The curves in FIG. 2 provide the heat cycles experienced by the PEEK and PA 12 powders during the cooling cycle, therefore during the cycle that has to enable the coalescence of the powders and of the layers with one another, and also the viscosity of the two polymers.

Case of PEEK HP3 (PEEK Available from the Company EOS)

The cycle is the following: Tmax=400° C. then Tbed of 362° C. as applied in a sintering machine.

Case of PA 12 PA 2200 (PA 12 Available from the Company EOS).

The cycle is the following: Tmax=230° C. then Tbed of 174° C. as applied in a sintering machine.

The measurements are carried out in an ARES rheometer (from Rheometric Scientific), at a stress frequency of 1 rad/s between parallel plates (diameter 25 mm) and with a cooling rate of 0.5° C./min.

The viscosity curve shows that under the experimental conditions (Tbed) for sintering these 2 materials, these 2 materials have a viscosity of the same order of magnitude and less than 10,000 Pa·s for 10 minutes. This viscosity range and the open time (at least 10 minutes here) enables the coalescence of the powder and of the layers with one another. For such bed temperatures, the mechanical properties of the parts are optimal.

EXAMPLE 2

Figure 3:
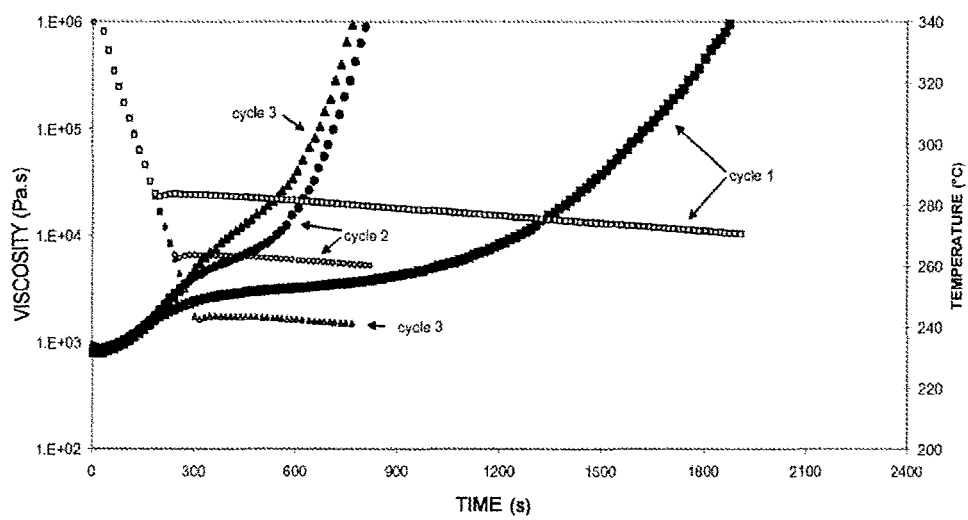
FIG. 3 shows curves of the heat cycles at three different bed temperatures experienced by the PEKK powder during the cooling cycle.

The curves in FIG. 3 provide the heat cycles at three different bed temperatures experienced by the PEKK powder during the cooling cycle, therefore during the cycles that have to enable the coalescence of the powders and of the layers with one another, and also the respective viscosities of the polymers.

A PEKK powder, Kepstan® 6003 from the company Arkema, the particle size of which has a dv50 of 50 μm±5 μm (denoted by Kepstan 6003 PL) is subjected to a rheological test according to 3 temperature cycles (3 different bed temperatures).

Cycle 1: Tmax=340° C. then Tbed of 285° C. (hollow square for the temperature, solid square for the viscosity).

Cycle 2: Tmax=340° C. then Tbed of 265° C. (hollow circle for the temperature, solid circle for the viscosity).

Cycle 3: Tmax=340° C. then Tbed of 245° C. (hollow triangle for the temperature, solid triangle for the viscosity).

The measurements are carried out in an ARES rheometer, at a stress frequency of 1 rad/s between parallel plates (diameter 25 mm) and with a cooling rate of 0.5° C./min. It is observed that the viscosity and the open time are greatly influenced by the temperature of the powder bed. For this grade, the optimal bed temperature for ensuring the coalescence of the powder and of the layers with one another is between 265° C. and 285° C. (between cycle 1 and cycle 2) in order to have a viscosity of less than 10,000 Pa·s for an open time of more than 10 minutes.

A machine test at a bed temperature of 240° C. showed that the successive layers had not coalesced due to their excessively high viscosities.

On the other hand, a machine test at a bed temperature of 300° C. showed that the melted layer collapsed through the powder bed.

EXAMPLE 3

Figure 4:
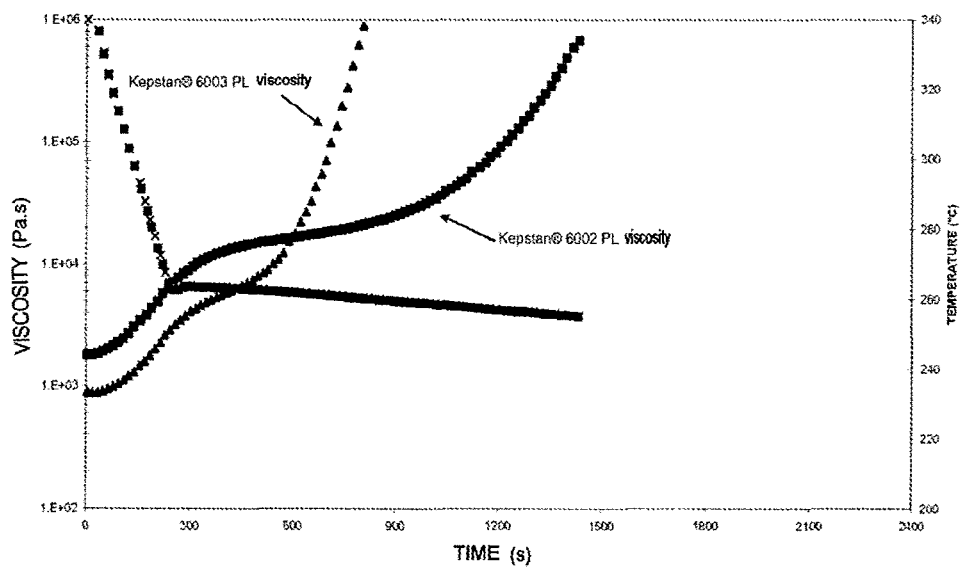
FIG. 4 shows curves of the heat cycle experienced by two PEKK powders of different molecular weights during the cooling cycle.

The curves in FIG. 4 provide the heat cycle experienced by two PEKK powders of different molecular weights during the cooling cycle, therefore during the cycle that has to enable the coalescence of the powder and of the layers with one another, and also the viscosities of the two polymers.

Kepstan® 6003 and Kepstan® 6002 powders from the company Arkema, the particle size of which has a dv50 of 50 μm±5 μm (denoted by 6003 PL and 6002 PL) are subjected to a rheological test according to the following cycle.

Cycle: Tmax=340° C. then Tbed of 265° C. (viscosity: solid triangle for 6003 PL and solid square for 6002 PL).

Kepstan® 6003 PL and 6002 PL are commercial products from the company Arkema.

They correspond to PEKKs having the same chemical structure but with two different molecular weights (6003 PL has a lower molecular weight than 6002 PL).

Kepstan® 6003 PL: MVI (under 1 kg at 380° C.) between 8 and 16 cm$^3$/10 min.

Kepstan® 6002 PL: MVI (under 5 kg at 380° C.) between 24 and 50 cm³/10 min.

The measurements are carried out in an ARES rheometer, at a stress frequency of 1 rad/s between parallel plates (diameter 25 mm) and with a cooling rate of 0.5° C./min.

This curve shows that the molecular weight has a significant influence on the viscosity of the material at the temperature of the bed and also on the open time.

This methodology therefore makes it possible to demonstrate that the ideal temperature of the powder bed will not depend solely on the chemical structure of the polymer but also on its molecular weight.

The invention claimed is:

1. A composition comprising a semicrystalline polymer having a viscosity of between 800 and 20,000 Pa·s over a time of more than 5 minutes, the viscosity measurements being carried out in a plate-plate rheometer device at a stress frequency of less than 5 rad/s, said composition being supercooled to a temperature T below the melting temperature after exposure to a temperature Tmax above its melting point, wherein the composition is configured for use in a device for manufacturing objects by melting polymer powders.

2. The composition of claim 1, wherein the composition is a polyamide.

3. The composition of claim 1, wherein the composition is a filled polyamide.

4. The composition of claim 1, wherein the composition is a polyaryletherketone.

5. The composition of claim 1, wherein the composition is a filled polyaryletherketone.

6. The composition of claim 1, wherein the semicrystalline polymer has a viscosity of between 800 and 20,000 Pa·s over a time of more than 10 minutes.

7. The composition of claim 1, wherein the semicrystalline polymer has a viscosity of between 1000 and 10,000 Pa·s over a time of more than 5 minutes.

8. The composition of claim 1, wherein the semicrystalline polymer has a viscosity of between 1000 and 10,000 Pa·s over a time of more than 10 minutes.

9. The composition of claim 1, wherein the composition is configured for use in a device for manufacturing objects by laser sintering of polymers.

* * * * *